(12) United States Patent
Cohn (10) Patent No.: US 7,903,662 B2
(45) Date of Patent: Mar. 8, 2011

(54) VIRTUAL CONCATENATION SEQUENCE MISMATCH DEFECT DETECTION

(75) Inventor: Jonathan D. Cohn, Novato, CA (US)

(73) Assignee: Cisco Technology, Inc., San Jose, CA (US)

( * ) Notice: Subject to any disclaimer, the term of this patent is extended or adjusted under 35 U.S.C. 154(b) by 1024 days.

(21) Appl. No.: 11/191,553

(22) Filed: Jul. 28, 2005

(65) Prior Publication Data

US 2007/0168785 A1    Jul. 19, 2007

(51) Int. Cl.
*H04L 12/28* (2006.01)
*H04L 12/56* (2006.01)
*H04L 1/00* (2006.01)
*G06F 15/16* (2006.01)

(52) U.S. Cl. .................. 370/394; 709/231; 714/747

(58) Field of Classification Search .......... 370/394
See application file for complete search history.

(56) References Cited

U.S. PATENT DOCUMENTS

| | | | |
|---|---|---|---|
| 5,001,708 A | | 3/1991 | Williams et al. |
| 6,842,787 B2 | | 1/2005 | Stadler et al. |
| 7,020,158 B2 * | | 3/2006 | Rouaud ............... 370/465 |
| 7,620,030 B1 * | | 11/2009 | Kirk ............... 370/351 |
| 7,724,781 B1 * | | 5/2010 | Wu et al. ............... 370/510 |
| 2001/0048660 A1 * | | 12/2001 | Saleh et al. ............... 370/216 |
| 2002/0080812 A1 * | | 6/2002 | Stadler et al. ............... 370/442 |
| 2002/0176432 A1 * | | 11/2002 | Courtney et al. ............. 370/415 |
| 2003/0095563 A1 * | | 5/2003 | Wu ............... 370/442 |
| 2004/0062277 A1 * | | 4/2004 | Flavin et al. ............... 370/474 |
| 2004/0120362 A1 * | | 6/2004 | Chohan et al. ............... 370/907 |
| 2005/0147121 A1 * | | 7/2005 | Burrell et al. ............... 370/468 |
| 2006/0187715 A1 * | | 8/2006 | Narvaez et al. ........... 365/185.24 |
| 2006/0222005 A1 * | | 10/2006 | Gorshe et al. ............... 370/466 |

FOREIGN PATENT DOCUMENTS

DE     198 13 168 A1     9/1999

OTHER PUBLICATIONS

Jones et al., "A Proposed Link Capacity Adjustment Scheme (LCAS) for SONET Virtually Concatenated SPEs," Cntribution to T1 Standards Project—T1XL5, Nov. 2000, pp. 1-26.

* cited by examiner

*Primary Examiner* — William Trost, IV
*Assistant Examiner* — Andrew Chriss (57) ABSTRACT

Methods and apparatus for identifying sequence mismatch defects associated with members of a virtual concatenation (VCAT) group are disclosed. According to one aspect of the present invention, a method for detecting sequence mismatch defects associated with a VCAT group that substantially terminates at a VCAT sink includes obtaining a first set of sequence numbers associated with the VCAT group at a first time, and determining whether a first sequence number of the first set is invalid. The method also includes identifying the first sequence number as having a sequence mismatch defect if the first sequence number is determined to be invalid.

30 Claims, 5 Drawing Sheets

VIRTUAL CONCATENATION SEQUENCE MISMATCH DEFECT DETECTION

BACKGROUND OF THE INVENTION

1. Field of Invention

The present invention relates generally to optical networks. More specifically, the present invention relates to detecting sequence mismatch defects associated with virtual concatenation groups at a dynamic sink.

2. Description of the Related Art

The Synchronous Optical Network (SONET) and Synchronous Digital Hierarchy (SDH) transport hierarchies provide voice and private line services using time division multiplexing (TDM). Within SONET and SDH transport networks, virtual concatenation (VCAT) improves flexibility and the efficiency.

Virtual concatenation (VCAT) is generally an inverse multiplexing technique that enables multiple SONET or SDH channels to be substantially bound into a VCAT group. VCAT is defined, for example, within ITU-T G.707 and ITU-T G.783, which are each incorporated herein by reference. A VCAT group, which includes "N" members, is effectively a byte-synchronous stream. If the VCAT group is symmetric, there are "N" receiving members of the group and "N" transmitting members of the group. Alternatively, if the VCAT group is asymmetric, there may be "N" receiving members of the group and any number of transmitting members of the group. In general, VCAT enables data, e.g., SONET or SDH payloads, to be carried in smaller bandwidth "containers" such as synchronous payload envelopes through a network to a destination at which the data is reassembled. The smaller bandwidth containers are effectively used to create a higher bandwidth overall connection between two end points.

Figure 1A:
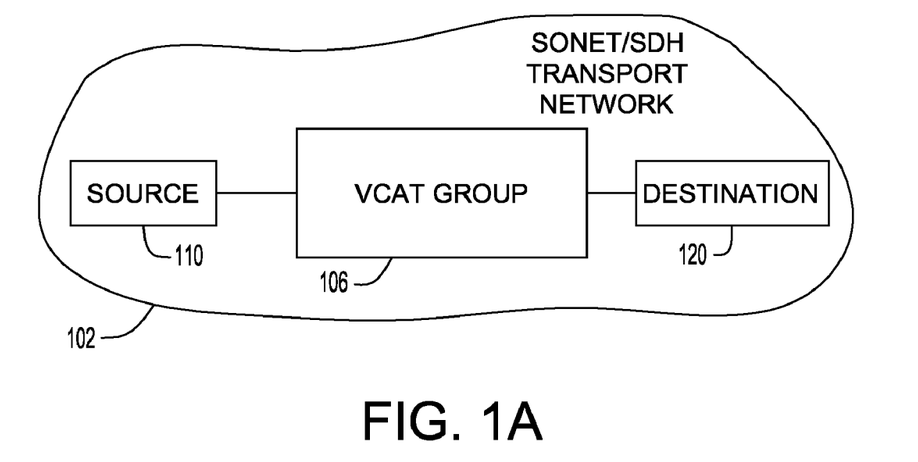
FIG. 1A is a block diagram representation of a virtual concatenation (VCAT) group within a network.

FIG. 1A is a block diagram representation of a virtual concatenation (VCAT) group within a network. Within a transport network 102, data may be sent from a source 110 to a destination 120. It should be appreciated that source 110 and destination 120 are generally network elements that send and to receive, respectively. Source 110 and destination 120 are in communication over a VCAT group 106 that is arranged to include different paths over which data may travel at substantially the same time.

Figure 1B:
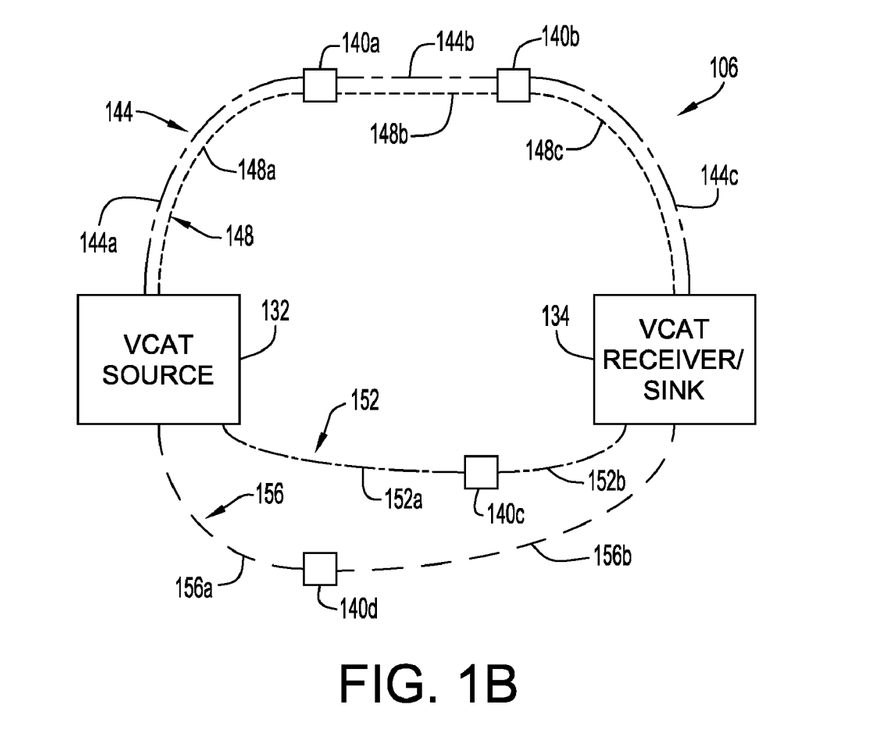
FIG. 1B is a diagrammatic representation of a VCAT source and a VCAT receiver associated with a VCAT group with multiple members, i.e., VCAT group 106 of FIG. 1A.

VCAT group 106, as shown in FIG. 1B, includes a VCAT source 132 and a VCAT receiver or sink 134. VCAT receiver 134 is generally a path terminating device. In general, as previously mentioned, VCAT group 106 includes "N" member or paths. VCAT group 106 is shown as including four paths, namely paths 144, 148, 152, 156. Path 144 passes through network elements 140a, 140b, and includes links 144a-c. Path 148 also passes through network elements 140a, 140b, but includes links 148a-c. Path 152 includes links 152a, 152b, and passes through a network element 140c, while path 156 includes links 156a, 156b, and passes through a network element 140d.

Each path 144, 148, 152, 156 may be identified by a sequence number. Sequence numbers typically range from zero to "N–1". As VCAT group 106 includes four paths, sequence numbers associated with VCAT group 106 range from zero to three. Typically, sequence numbers associated with paths 144, 148, 152, 156 must be verified by VCAT receiver 134. That is, VCAT receiver 134 verifies that the sequence numbers associated with paths 144, 148, 152, 156 match expected sequence numbers stored within VCAT receiver 134. VCAT receiver 134 uses the sequence numbers to reconstruct an overall data stream that was sent on paths 144, 148, 152, 156.

The ability to verify sequence numbers or, more specifically, to identify sequence mismatch defects associated with a VCAT group is crucial to ensure the integrity of the VCAT group. When a VCAT group is configured, a person responsible for configuring the VCAT group generally must have a detailed understanding of the hardware capabilities of a VCAT receiver associated with the VCAT group, as that person typically specifies the expected sequence numbers in the VCAT receiver. Specifying expected sequence numbers in a VCAT receiver may be a time-consuming task, as the hardware capabilities of the VCAT receiver are often complicated to comprehend.

In some implementations, expected sequence numbers that are used to identify sequence mismatch defects are programmed into a VCAT receiver dynamically based on sequence numbers received, for example, during a polling cycle associated with the VCAT receiver. Such programming may occur using software or using hardware which programs expected sequence numbers in real-time. Generally, a static VCAT receiver has provisioned, expected sequence numbers. These expected sequence numbers may be supplied by network elements that are in communication with the static VCAT receiver either explicitly or implicitly, e.g., derived from a parameter provided by the network elements. A dynamic VCAT receiver typically does not have any provisioned, expected sequence numbers. For a static VCAT receiver, an issue arises regarding the accuracy of received sequence numbers that are used as expected sequence numbers. If the received sequence numbers are invalid, e.g., either greater than "N–1" for an "N" member VCAT group or duplicated, using invalid sequence numbers as expected sequence compromises the integrity of the VCAT group and, hence, the overall network of which the VCAT group is a part.

Therefore, what is needed is a method and an apparatus which allows sequence mismatch defects to be accurately and efficiently detected. That is, what is desired is a system which enables sequence mismatch defects associated with one or more members of a VCAT group to be identified dynamically.

SUMMARY OF THE INVENTION

The present invention relates to identifying sequence mismatch defects associated with members of a virtual concatenation (VCAT) group. According to one aspect of the present invention, a method for detecting sequence mismatch defects associated with a VCAT group that substantially terminates at a VCAT sink includes obtaining a first set of sequence numbers associated with the VCAT group at a first time, and determining whether a first sequence number of the first set is defective. Determining whether the first sequence number is defective includes determining whether the first sequence number is invalid. The method also includes identifying the first sequence number as having a sequence mismatch defect if the first sequence number is determined to be invalid.

In one embodiment, the first sequence number is determined to be invalid if it is either a duplicate of a second sequence number of the first set, or if it is out of bounds. In such an embodiment, the first sequence number may also be determined to be invalid if it does not match sequence numbers stored in a second set of sequence numbers that was obtained during a previous polling cycle.

If a VCAT sink is configured to identify sequence mismatch defects by comparing current sequence numbers obtained from a VCAT group against previously obtained sequence numbers, the VCAT sink may verify the sequence numbers efficiently and effectively. Further, the need to use expected sequence numbers stored in the VCAT sink to identify sequence mismatch defects is substantially eliminated. If there are discrepancies between the current sequence numbers and the previous sequence numbers, there may be sequence mismatch defects associated with the current sequence numbers. For VCAT sinks in which expected sequence numbers are stored, information pertaining to current sequence numbers and previously obtained sequence numbers may be used to allow the expected sequence numbers to be accurately updated.

According to another aspect of the present invention, a sink associated with a VCAT group includes a processor, a memory that includes a first data structure such as an array, and devices that cooperate with the processor to obtain current sequence numbers associated with the VCAT group. The devices also store the current sequence numbers into the first data structure and identify sequence mismatch defects associated with the current sequence numbers. The devices that identify sequence mismatch defects associated with the current sequence numbers identify ones of the current sequence numbers that are out of bounds and ones of current sequence numbers that are duplicates.

In one embodiment, the devices also store previous sequence numbers associated with the VCAT group into a second data structure in the memory. In such an embodiment, the devices may also compare the set of current sequence numbers against the set of previous sequence numbers to identify sequence mismatch defects. In another embodiment, the devices may be either or both hardware devices and program code devices that the processor may cause to execute.

According to another aspect of the present invention, a method for updating expected sequence numbers stored in a memory of a VCAT receiver includes obtaining a set of current sequence numbers associated with the VCAT group, as well as determining whether the set of current sequence numbers associated with the VCAT group does not include a first invalid sequence number. If the set of current sequence numbers is determined not to include a first invalid sequence number, the method involves determining if a set of previous sequence numbers associated with the VCAT group includes at least one invalid sequence number. Finally, the method includes replacing the expected sequence numbers with the set of current sequence numbers if it is determined that the set of previous sequence numbers includes at least one invalid sequence number.

In one embodiment, the method also includes setting a first variable to a first value to indicate that the set of current sequence numbers includes substantially only valid sequence numbers if the set of current sequence numbers does not include the invalid sequence numbers. If the set of previous sequence numbers includes at least one invalid sequence number, the first variable is such that it was previously set to a second value, e.g., a value that indicated that the set of previous sequence numbers includes at least one invalid sequence number.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The ability to accurately and efficiently identify sequence mismatch defects associated with virtual concatenation (VCAT) groups in Synchronous Optical Network (SONET) and Synchronous Digital Hierarchy (SDH) transport networks allows the integrity of the VCAT groups to be maintained. If sequence mismatch defects are efficiently identified, proper steps may be taken to address the sequence mismatch defects in a timely manner. Hence, the overall performance of the transport networks of which the VCAT groups are a part may be improved.

Enabling a VCAT receiver or sink to identify sequence mismatch defects through a comparison of current sequence numbers against previously obtained sequence numbers allows the VCAT receiver to effectively become a dynamic receiver. If there are discrepancies between the current sequence numbers and the previous sequence numbers, it may be determined that there are sequence mismatch defects. For VCAT receivers which store expected sequence numbers, information pertaining to current sequence numbers and previously obtained sequence numbers may be used to both facilitate the identification of the expected sequence numbers and to increase the likelihood that the expected sequence numbers are valid. For instances in which expected sequence numbers are required by the VCAT receiver, such expected sequence numbers may be derived from received sequence numbers, and may not need to be known in advance.

Current sequence numbers and previously obtained sequence numbers may generally be stored in memory within a VCAT receiver. In one embodiment, both the current sequence numbers and the previously obtained sequence numbers may be stored at least temporarily in arrays within memory associated with the VCAT receiver. Current sequence numbers may be obtained periodically, as for example every few milliseconds or every polling cycle. Whenever the contents are updated in the array in which the current sequence numbers are to be stored, the previous contents of that array may be copied into the array in which previously obtained sequence numbers are to be stored.

Figure 2:
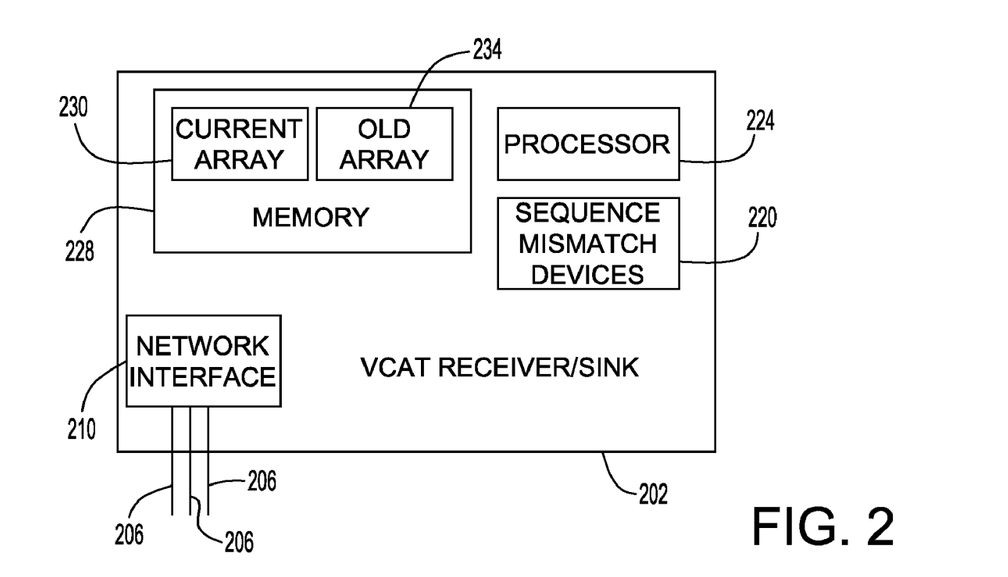
FIG. 2 is a block diagram representation of a VCAT receiver in accordance with one embodiment of the present invention.

FIG. 2 is a block diagram representation of a VCAT receiver in accordance with one embodiment of the present invention. A VCAT receiver or sink 202 is a device or path terminating element that is arranged to effectively be a terminating point or node for members or paths 206 of a VCAT group with "N" receiving members. VCAT receiver 202 is also arranged to substantially reconstruct a data stream by collecting data received from any or all members or paths 206. VCAT receiver 202 may either be configured with information relating to how many components are associated with the VCAT group, or may be arranged to be informed of how many components are in the VCAT group.

Members or paths 206 may generally be SONET paths or SDH paths. Members or paths 206 may effectively be in communication with VCAT receiver 202 via a network interface 210. It should be appreciated that network interface 210 may enable data to be received by VCAT receiver 202 and also enable data to be set by VCAT receiver 202.

VCAT receiver 202 includes sequence mismatch devices 220 which, in one embodiment, are hardware devices that may cooperate with a processor 224 to allow sequence mismatch defects associated with members or paths 206 to be identified. The hardware devices may include various electrical components such as integrated circuits, e.g., application specific integrated circuits, that are arranged to identify sequence mismatch defects. It should be appreciated, however, that sequence mismatch devices 220 may also include software or program code devices stored on a computer-readable medium which may be executed by processor 224. Sequence mismatch devices 220 may obtain the sequence numbers associated with members or paths 206, and cause a current array 230 in a memory 228 to store the obtained sequence numbers. Sequence mismatch defects may be identified by sequence mismatch devices 220 during processing of the contents of current array 230, as well as processing of the contents of a previous or old array 234 in memory 228 that is arranged to store previous sequence numbers. The contents of previous array 234 are typically sequence numbers associated with the VCAT group that were previously obtained, as for example during the immediately preceding polling in which an attempt was made to identify sequence mismatch defects.

Sequence mismatch devices 220 are generally arranged to mark current array 230 to indicate the elements within current array 230 which contain sequence mismatch defects. Current array 230 may be marked when markers or values are placed into an array or column of current array 230 that is appropriate for identifying particular sequence numbers stored in another row or column, respectively, as having a sequence mismatch defect. A sequence mismatch defect, or a loss of sequence, may involve an out of bounds sequence number, or a sequence number that is higher than "N−1" for a VCAT group with "N" receiving members or lower than "0." A sequence mismatch defect may also involve duplicate sequence numbers, as well as sequence numbers that do not match those stored in previous array 234.

In general, a VCAT receiver for a VCAT group with "N" receiving members expects received sequence numbers to be a member of the set of positive integer numbers between "0" and "N−1". Any sequence number that is not in the set of positive integers between "0" and "N−1" is considered to be out of bounds. Hence, sequence numbers that are either positive integers that are greater than or equal to "N" for a VCAT group with "N" receiving members or are negative integers may be considered to be out of bounds.

Figure 3:
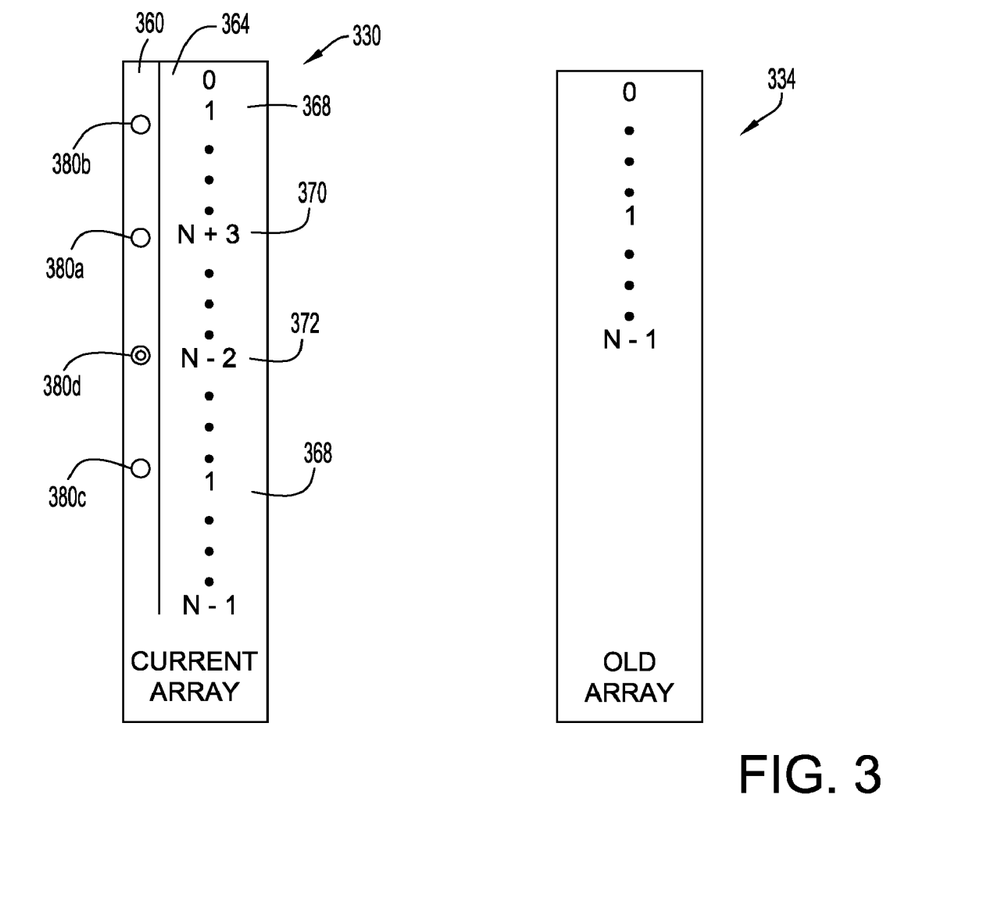
FIG. 3 is a diagrammatic representation of a current array that is marked to indicate each detected sequence mismatch defect as well as an old array against which the current array is compared in accordance with an embodiment of the present invention.

Referring next to FIG. 3, the marking of sequence mismatch defects in a current array or, more generally, a data structure that contains sequence number inputs from a VCAT group with "N" receiving members, will be described in accordance with an embodiment of the present invention. A current array 330 includes an area 364 in which sequence numbers associated with a VCAT group with "N" receiving members are located. For ease of discussion, a VCAT group with "N" receiving members will generally be described as a VCAT group with "N" members. It should be appreciated that such a VCAT group, i.e., a VCAT group with "N" members, includes "N" receiving members and may generally include any number of transmitting members. If out of bounds sequence numbers or duplicate sequence numbers are found within current array 364, such sequence numbers are marked as having a sequence mismatch defect. In general, sequence mismatch defects may be identified by placing a bit or bits in an area 360. By way of example, if areas 360, 364 are columns, a sequence mismatch defect indicator may be placed within column 360 in the same row in which mismatched sequence number is stored within column 364.

A sequence number 370 is an out of bounds sequence number, as "N+3" is a larger number than the maximum permissible sequence number, i.e., sequence number "N−1", associated with the VCAT group with N members. In general, "N" represents the maximum number of members within a VCAT group, and may vary widely. By way of example, for higher-order VCAT, "N" may have a value of approximately 256, whereas for lower-order VCAT, "N" may have a value of approximately 64. Typically, "N" has a value that falls in the range between 1 and 256.

As sequence number 370 is out of bounds, an indication 380a that sequence number 370 has a sequence mismatch defect is placed in area 360. Sequence numbers 368 are duplicates and, as a result, are each identified as having sequence mismatch defects with indications 380b, 380c in area 360. Though sequence number 372 is neither out of bounds nor a duplicate of any other sequence number stored in area 364, sequence number 372 does not match any sequence number in a previous array 334 that is arranged to store sequence numbers obtained previously, e.g., during a previous polling cycle associated with a VCAT receiver such as receiver 202 of FIG. 2. Hence, sequence number 372 is marked in area 360 with an indication 380d that is arranged to identify sequence number 372 as having a sequence mismatch defect.

In the described embodiment, sequence numbers that are out of bounds such as sequence number 370 may be marked the same way as duplicate sequence numbers 368. That is, sequence mismatch defects may be marked so as not to differentiate between different types of sequence mismatch defects. However, it should be appreciated that sequence numbers that are out of bounds may instead be marked differently from sequence numbers that are duplicates. Similarly, although sequence numbers such as sequence number 372 that does not match sequence numbers stored in previous or old array 334 may be marked differently than those sequence numbers that are out of bounds or duplicates, as shown, substantially all sequence mismatch defects may be indicated using the same marker.

Figure 4A:
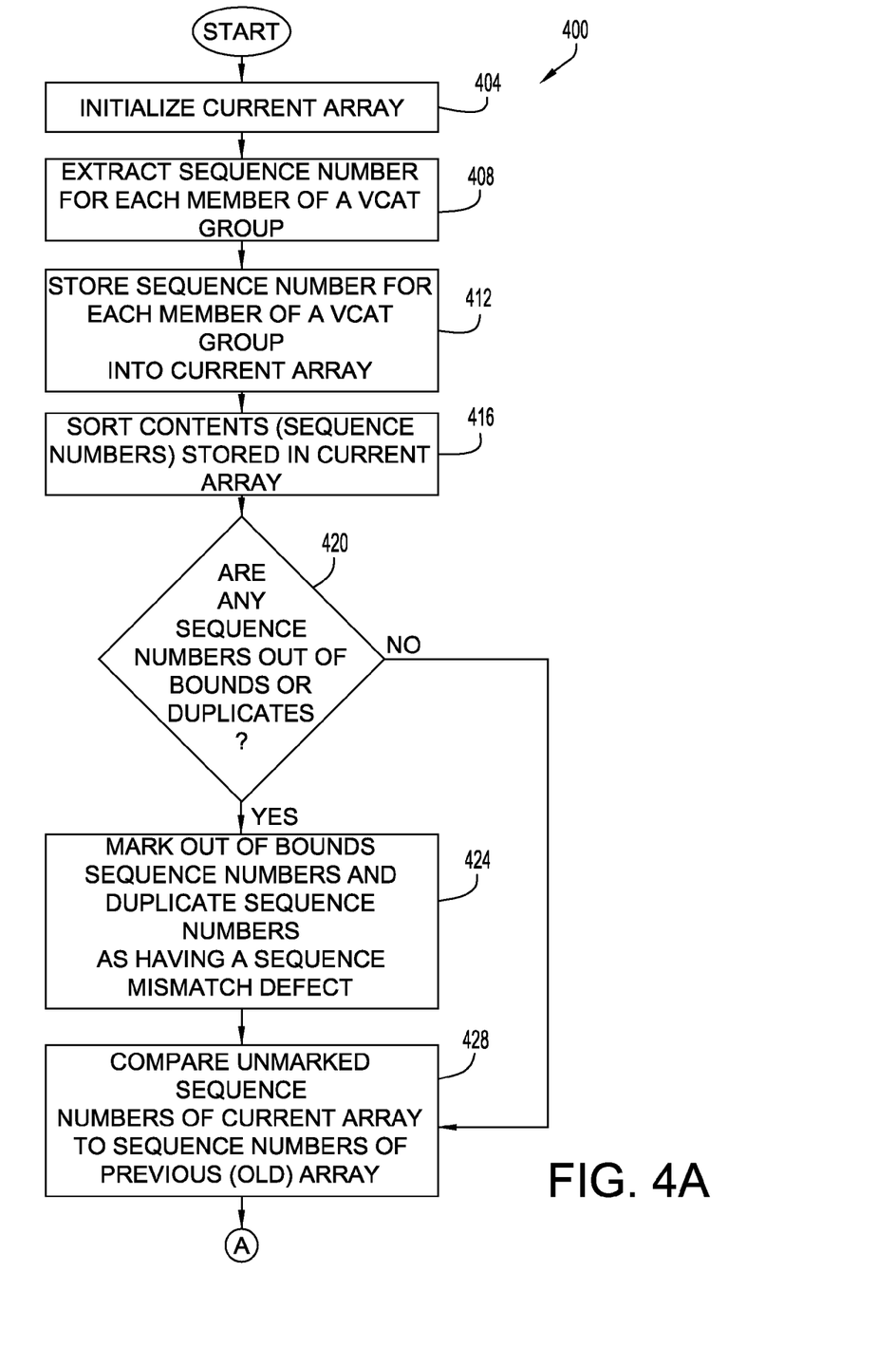
FIGS. 4A and 4B are a process flow diagram which illustrates one method of detecting sequence mismatch defects in accordance with an embodiment of the present invention.
Figure 4B:
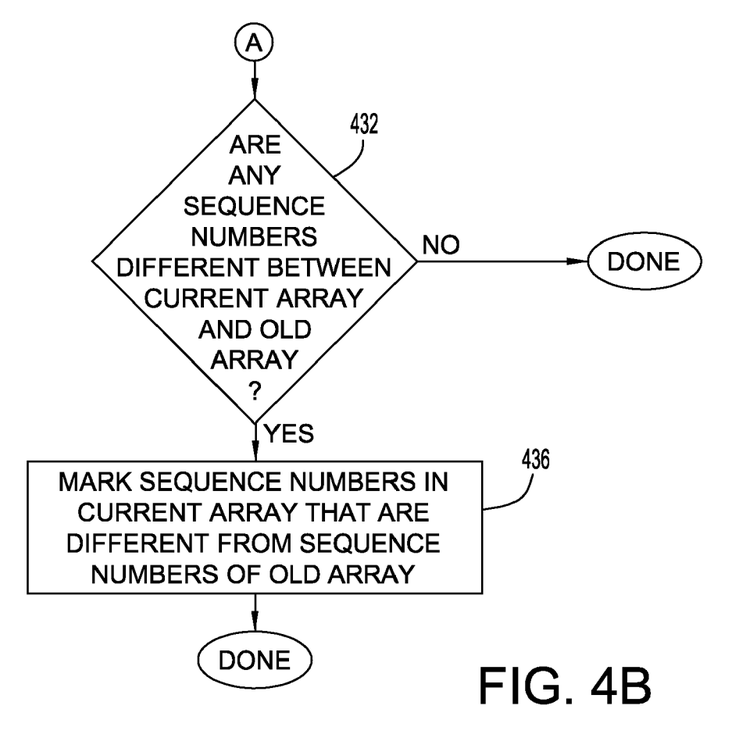

With reference to FIGS. 4A and 4B, one method of detecting sequence mismatch defects with a dynamic sink or receiver will be described in accordance with an embodiment of the present invention. A process 400 of detecting or identifying sequence mismatch defects begins at step 404 in which a current array is initialized. A current array, which may be stored in a memory of a VCAT receiver, is arranged to hold the sequence numbers of current members or paths in a VCAT group. Initializing the current array may involve setting the values of an empty array, as for example to values of zero, if the array has not been used. Alternatively, if the current array contains sequence numbers associated with the VCAT group, initializing the current array may include substantially copying sequence numbers associated with the VCAT group into another array, e.g., a previous or old array, and then setting the values in the current array to values of zero.

Once the current array is initialized, the sequence number for each member of the VCAT group is extracted or otherwise obtained in step 408. Components of the VCAT receiver, as for example sequence mismatch devices 220 of FIG. 2, may be arranged to allow the sequence number for each member of the VCAT group to be extracted. After the sequence numbers are extracted, each extracted sequence number is stored into the current array in step 412. Then, in step 416, the stored sequence numbers may be sorted. That is, the contents of the current array may be sorted such that the sequence numbers are effectively in numerical order, e.g., either ascending or descending. The sorting of sequence numbers in numerical order generally facilitates the processing of the sequence numbers.

A determination is made in step 420 regarding whether any of the sequence numbers stored in the current array are out of bounds or duplicates. Determining whether any of the sequence numbers stored in the current array are out of bounds or duplicates generally entails determining whether any of the sequence numbers are illegal or invalid. As previously mentioned, sequence numbers typically fall between zero and "N−1" for a VCAT group that includes "N" members. Hence, a sequence number that is stored in the current array may be considered to be out of bounds if that sequence number has a value that is greater than "N−1."

If it is determined in step 420 that none of the sequence numbers are out of bounds or duplicates, i.e., that all of the sequence numbers are in bounds and non-duplicated, the indication is that there are no sequence mismatch defects associated with the sequence numbers stored in the current array. Accordingly, none of the sequence numbers stored in the current array are marked as having sequence mismatch defects, and process flow moves from step 420 to step 428 in which the unmarked sequence numbers stored in the current array are compared to the sequence numbers stored in a previous, or old, array.

Once the sequence numbers stored in the current array are compared to the sequence numbers stored in the previous array, it is determined in step 432 whether there are any sequence numbers that are different between the current array and the previous array. That is, a determination is made regarding whether the sequence numbers stored in the current array match the sequence numbers stored in the previous array. If the determination is that substantially all of the sequence numbers stored in the current array match the sequence numbers stored in the previous array, then the process of identifying sequence mismatch defects is completed.

Alternatively, if it is determined in step 432 that there are differences between the sequence numbers stored in the current array and the sequence numbers stored in the previous array, the indication is that there is at least one sequence mismatch defect associated with the current array. As such, in step 436, any sequence numbers in the current array that are different from the sequence numbers in the previous array are marked as having a sequence mismatch defect. After the sequence numbers in the current array are marked as appropriate, the process of identifying sequence mismatch defects is completed.

Returning to step 420, if it is determined that there is at least one sequence number in the current array that is either out of bounds or duplicated, the indication is that there is at least one sequence mismatch defect associated with the current array and, hence, the VCAT group for which sequence numbers are stored in the current array. Accordingly, process flow moves from step 420 to step 424 in which any out of bounds sequence number or duplicate sequence number is marked as having a sequence mismatch defect. In one embodiment, a column of the current array may be arranged to be marked to indicate which sequence numbers stored in the current array have sequence mismatch defects. Once the sequence mismatch defects are marked, the sequence numbers stored in the current array that are unmarked are compared to sequence numbers stored in a previous array in step 428.

Figure 5:
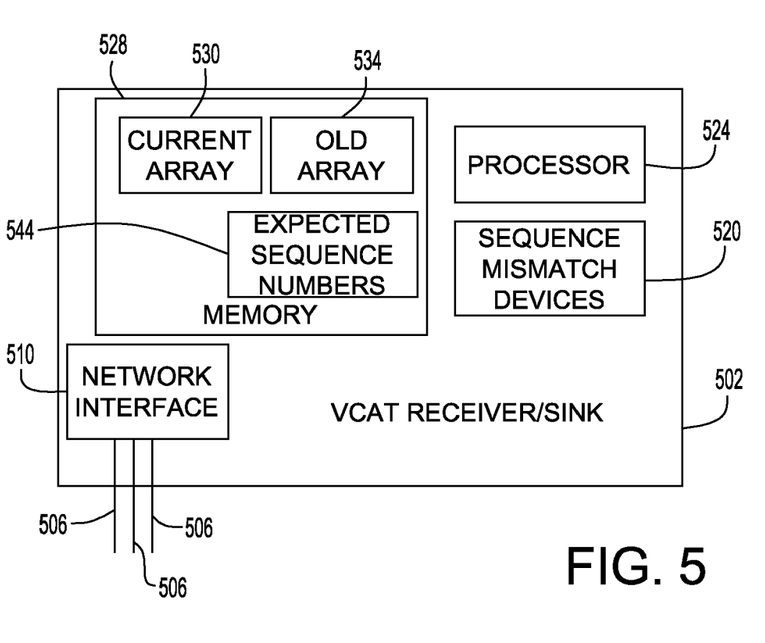
FIG. 5 is a block diagram representation of a VCAT receiver that stores expected sequence numbers in accordance with an embodiment of the present invention.

In some systems, VCAT receivers are such that expected sequence numbers are stored on the VCAT receivers. Expected sequence numbers generally correspond to the sequence numbers that are expected to correspond to a VCAT group that terminates at the VCAT receiver. Such VCAT receivers may have expected sequence numbers programmed therein, either in hardware or in software. FIG. 5 is a block diagram representation of a VCAT receiver in which expected sequence numbers are stored in accordance with one embodiment of the present invention. A VCAT receiver 502 includes sequence mismatch devices 520 and a processor 524 that are arranged to cooperate to identify sequence mismatch defects associated with paths 506 associated with a VCAT group that terminates at VCAT receiver 502. Typically, there are "N" paths 506 that correspond to a VCAT group with "N" members. Paths 506 typically enter VCAT receiver 502 via a network interface 510.

A memory 528 is arranged to contain a current array 530 that holds the most current sequence numbers associated with paths 506. An old array 534, which is also stored in memory 528, is arranged to contain previously obtained sequence numbers associated with paths 506. Expected sequence numbers 544 are also stored in memory 528. Expected sequence numbers 544, which may be stored in substantially any suitable data structure, are generally the sequence numbers that paths 506 are expected to have.

The ability to update expected sequence numbers 544 enables expected sequence numbers 544 to be relatively accurate. In other words, as expected sequence numbers 544 that are substantially programmed into VCAT receiver 502 when VCAT receiver 502 is effectively initialized may not be entirely accurate, the ability to update expected sequence numbers 544 when information that may be more accurate or up-to-date is available. Information that is more accurate may correspond to sequence numbers that are stored in current array 530 and old array 534. For example, if current array 530 and old array 534 contain substantially the same sequence numbers, then those sequence numbers may be considered to accurately reflect the sequence numbers that may be expected.

Figure 6:
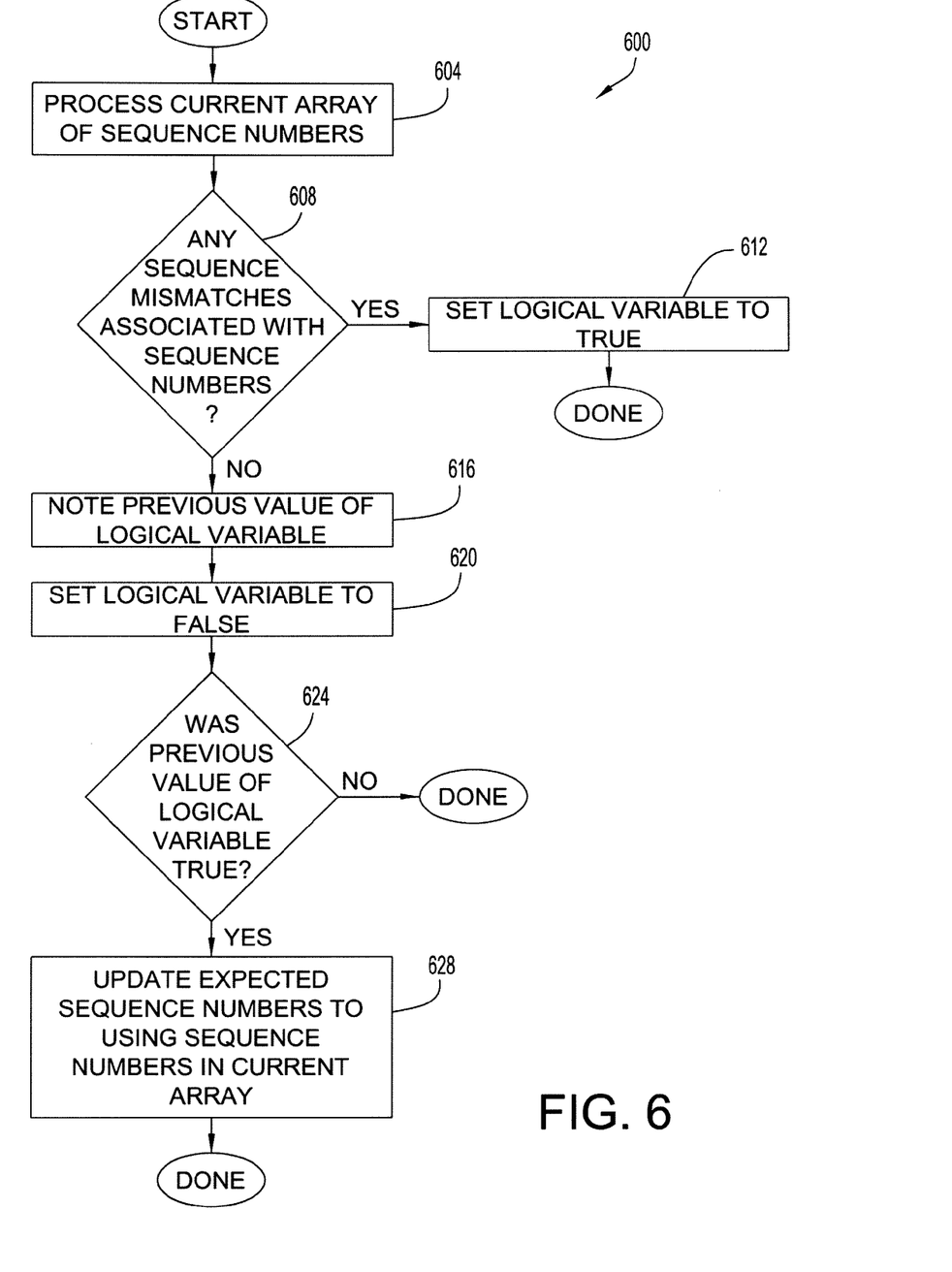
FIG. 6 is a process flow diagram which illustrates one method of updating stored expected sequence numbers in accordance with an embodiment of the present invention.

Referring next to FIG. 6, one method of updating expected sequence numbers that are stored within a VCAT receiver will be described in accordance with an embodiment of the present invention. A process of updating expected sequence numbers 600 begins at step 604 in which a current array of sequence numbers is processed. Processing a current array of sequence numbers may include writing sequence numbers into an array, as for example using sequence mismatch devices of a VCAT receiver, sorting the sequence numbers stored within the current array, and identifying any sequence mismatch defects in the current array. One method of processing a current array to identify sequence mismatch defects is described above with respect to FIGS. 4A and 4B.

After the current array is processed, a determination is made in step 608 as to whether there are any sequence mismatch defects associated with the sequence numbers stored in the current array. If it is determined that there are sequence mismatch defects, then a logical variable is set to a true value in step 612 to indicate that there are sequence mismatch defects associated with the most current sequence numbers, i.e., the sequence numbers stored in the current array. Such a logical variable may be a logical OR, in one embodiment. Once the logical variable is set to a true value or, more generally, is set to indicate that the current array has sequence mismatch defects, the process of updating expected sequence numbers is terminated.

If the determination in step 608 is that there are no sequence mismatch defects associated with the sequence numbers stored in the current array, the previous or existing value of the logical variable that is used to indicate whether a current array has sequence mismatch defects is noted in step 616. The previous value of the logical variable generally indicates whether there are sequence mismatches in an old array, as for example old array 534 of FIG. 5. After the previous value of the logical variable is noted, the logical variable is set in step 620 to indicate that the current array does not have sequence mismatch defects. In the described embodiment, setting the logical variable to indicate that the current array does not have sequence mismatch defects includes setting the logical variable to a false value.

From step 620, process flow moves to step 624 in which it is determined whether the previous value of the logical variable was true. That is, it is determined in step 624 whether the old array contained sequence mismatch defects when it was processed to identify sequence mismatch defects. If it is determined that the previous value of the logical variable was not true, then the indication is that the sequence numbers are relatively stable. Hence, the expected sequence values stored within the VCAT receiver are considered to be relatively accurate. As such, the process of updating expected sequence numbers is terminated.

Alternatively, if it is determined in step 624 that the previous value of the logical variable was true, then the implication is that the sequence numbers stored in the current array are likely to be the expected sequence numbers and, further that the current expected sequence numbers are likely to be outdated. Accordingly, in step 628, the expected sequence numbers are updated or reset within the VCAT receiver using the sequence numbers stored in the current array. The expected sequence numbers are, hence, effectively set dynamically, e.g., using software code devices. Once the expected sequence numbers are updated, the process of updating expected sequence numbers is completed.

Although only a few embodiments of the present invention have been described, it should be understood that the present invention may be embodied in many other specific forms without departing from the spirit or the scope of the present invention. By way of example, while sequence numbers have been described as being stored in an array for comparison purposes, the sequence numbers may be stored in substantially any suitable data structure. That is, arrays are but one example of a data structure in which current and previous sequence numbers may be stored. In addition, in lieu of storing sequence numbers in a data structure, sequence numbers may instead be stored in temporary variables within a memory associated with a VCAT receiver.

As discussed above, in one embodiment, a method for detecting sequence mismatch defects may be performed using substantially only hardware components. For example, such a method may be implemented using an application specific integrated circuit (ASIC) or using a field-programmable gate array (FPGA).

A sequence number has generally been described as being invalid or illegal when that sequence number is either out of bounds or duplicated. That is, a sequence mismatch defect has been described as being detected when a sequence number is out of bounds or duplicated. It should be understood, however, that a sequence number is not limited to being invalid only if the sequence number is out of bounds or duplicated.

While the VCAT sequence mismatch defect detection of the present invention has been described as being suitable for use in either a SONET transport network or an SDH transport network, the VCAT sequence mismatch defect detection described above may generally be implemented within any suitable network. Further, although a VCAT sequence mismatch defect detection scheme may be a hardware oriented implementation, such a scheme may also be implemented as a combination hardware and software implementation, or as a substantially software implementation.

A VCAT receiver may be a component of a network element such as a router or a computing system. If a VCAT receiver is a component of a computing system, the VCAT receiver may cooperate with other components of the computing system to perform sequence mismatch defect detection. Other components of the computing system may include, but are not limited to, a processor, a random access memory, a read only memory, a network interface, input devices, and display devices.

Generally, VCAT groups with N members may symmetric and bidirectional. It should be appreciated, however, that VCAT groups may instead by asymmetric and unidirectional. In one embodiment, a VCAT group may include both symmetric and asymmetric members. The present invention describes the behavior of a VCAT receiver that terminates "N" receiving members of a VCAT group, though the number of transmitting members of the VCAT group may or may not be "N". For a symmetric VCAT group, there are "N" receiving members and "N" transmitting members. In an asymmetric VCAT group, there may be "N" receiving members and substantially any number of transmitting members.

The steps associated with the processes associated with sequence mismatch defect detection may vary widely. Steps may be added, removed, altered, and reordered without departing from the spirit or scope of the present invention. For example, the step of sorting the contents of an array to facilitate checking for sequence numbers that are duplicates or out of bounds may be removed or replaced without departing from the spirit or the scope of the present invention. In other words, sorting the contents of an array may be optional.

Additionally, in one embodiment, the identification of sequence mismatch defects may occur substantially without comparing the contents of a current array against the contents of an old array. That is, sequence mismatch defects may be identified by checking for sequence numbers that are out of bounds as well as sequence numbers that are duplicates among the sequence numbers stored in a current array, and without checking to see if the sequence numbers stored in the current array match the sequence numbers stored in an old array. In such an embodiment, it may not be necessary to maintain an old array. Therefore, the present examples are to be considered as illustrative and not restrictive, and the invention is not to be limited to the details given herein, but may be modified within the scope of the appended claims.

What is claimed is:

1. A method for detecting sequence mismatch defects associated with a virtual concatenation (VCAT) group including a plurality of path members, the VCAT group being associated with a VCAT sink, the method comprising:

obtaining a first set of a plurality of sequence numbers by the VCAT sink from the VCAT group at a first time, wherein the sequence number of each VCAT group path member is dynamically obtained during a polling cycle associated with the VCAT sink to form the first set;

obtaining a second set of a plurality of sequence numbers associated with the VCAT group by the VCAT sink at a second time, the second time being before the first time, the second set of sequence numbers being obtained from the VCAT group, and wherein the sequence number of each VCAT group path member is dynamically obtained during a polling cycle associated with the VCAT sink to form the second set;

determining by the VCAT sink whether a first sequence number of the first set of sequence numbers is invalid, including comparing the first sequence number against the second set of sequence numbers to determine if the first sequence number matches any of the second set of sequence numbers; and identifying by the VCAT sink the first sequence number as having a sequence mismatch defect if it is determined that the first sequence number is invalid and does not match any of the second set of sequence numbers.

2. The method of claim 1 wherein the first set of sequence numbers includes a second sequence number, and determining whether the at least first sequence number is invalid includes determining whether the first sequence number and the second sequence number are the same.

3. The method of claim 2 wherein if it is determined that the first sequence number and the second sequence number are the same, the method further includes identifying both the first sequence number and the second sequence number as having sequence mismatch defects.

4. A method for detecting sequence mismatch defects associated with a virtual concatenation (VCAT) group including a plurality of path members, the VCAT group being associated with a VCAT sink, the method comprising:

obtaining a first set of sequence numbers by the VCAT sink from the VCAT group at a first time, wherein the sequence number of each VCAT group path member is obtained to form the first set;

obtaining a second set of sequence numbers associated with the VCAT group by the VCAT sink at a second time, the second time being before the first time, the second set of sequence numbers being obtained from the VCAT group, and wherein the sequence number of each VCAT group path member is obtained to form the second set;

determining by the VCAT sink whether a first sequence number of the first set of sequence numbers is invalid, including comparing the first sequence number against the second set of sequence numbers to determine if the first sequence number matches any of the second set of sequence numbers; and identifying by the VCAT sink the first sequence number as having a sequence mismatch defect if it is determined that the first sequence number is invalid, wherein the VCAT group includes N path members, and determining whether the first sequence number is invalid includes determining whether the first sequence number exceeds a value of one less than N.

5. The method of claim 1 wherein the VCAT sink includes a memory, the method further including:

storing the first set of sequence numbers into a first array, the first array being arranged in the memory.

6. The method of claim 1 further including:

storing the first set of sequence numbers into a first array, the first array being arranged in a memory of the VCAT sink; and storing the second set of sequence numbers into a second array, the second array being arranged in the memory.

7. An apparatus suitable for use in a transport network and being arranged as a sink associated with a virtual concatenation (VCAT) group including a plurality of path members, the apparatus comprising:

a memory, the memory being arranged to include a first data structure and a second data structure; and a processing device to dynamically obtain from a received data stream a set of a plurality of current sequence numbers from the VCAT group including a sequence number for each VCAT group path member, to store the set of current sequence numbers into the first data structure, to store a set of a plurality of previous sequence numbers dynamically obtained from a received data stream earlier from the VCAT group including a sequence number for each VCAT group path member into the second data structure, and to identify sequence mismatch defects associated with the set of current sequence numbers by determining current sequence numbers that are invalid by identifying current sequence numbers of the set of current sequence numbers that are out of bounds, identifying current sequence numbers of the set of current sequence numbers that are duplicates, and identifying current sequence numbers that do not match those of the set of previous sequence numbers.

8. The apparatus of claim 7 further including:
sorting the first set of sequence numbers.

9. One or more memory devices encoded with computer executable instructions, that when executed, are operable to:

cause a set of a plurality of current sequence numbers associated with a virtual concatenation (VCAT) group including a plurality of path members to be dynamically obtained from a received data stream, the VCAT group being associated with a VCAT sink and the set of current sequence numbers including a sequence number for each VCAT group path member;

cause the set of current sequence numbers to be stored into a first data structure and a set of a plurality of previous sequence numbers dynamically obtained from a received data stream earlier from the VCAT group including a sequence number for each VCAT group path member to be stored into a second data structure; and cause sequence mismatch defects associated with the set of current sequence numbers to be identified by determining current sequence numbers that are invalid by causing current sequence numbers of the set of current sequence numbers that are out of bounds to be identified, current sequence numbers of the set of current sequence numbers that are duplicates to be identified, and current sequence numbers of the set of current sequence numbers that do not match sequence numbers of the previous set of earlier sequence numbers to be identified.

10. An apparatus suitable for detecting sequence mismatch defects associated with a virtual concatenation (VCAT) group including a plurality of path members, the VCAT group being in communication with the apparatus, the apparatus comprising:

means for obtaining a first set of a plurality of sequence numbers from the VCAT group at a first time, wherein the sequence number of each VCAT group path member is dynamically obtained from a received data stream to form the first set;

means for obtaining a second set of a plurality of sequence numbers associated with the VCAT group at a second time, the second time being before the first time, the second set of sequence numbers being obtained from the VCAT group, and wherein the sequence number of each VCAT group path member is dynamically obtained from a received data stream to form the second set;

means for determining whether a first sequence number of the first set of sequence numbers is defective, including means for comparing the first sequence number against the second set of sequence numbers to determine if the first sequence number matches any of the second set of sequence numbers; and means for identifying the first sequence number as having a sequence mismatch defect if it is determined that the first sequence number is defective and does not match any of the second set of sequence numbers.

11. The apparatus of claim 10 wherein the first set of sequence numbers includes a second sequence number, and the means for determining whether the at least first sequence number is defective include means for determining whether the first sequence number and the second sequence number are the same.

12. The apparatus of claim 10 wherein the means for determining whether the first sequence number is defective include means for determining whether the first sequence number is out of bounds.

13. The apparatus of claim 10 further including:
a memory; and
means for storing the first set of sequence numbers into a first array, the first array being arranged in the memory.

14. The apparatus of claim 10 further including:
a memory;
means for storing the first set of sequence numbers into a first array, the first array being arranged in the memory; and
means for storing the second set of sequence numbers into a second array, the second array being arranged in the memory.

15. A method for updating expected sequence numbers stored in a memory of a virtual concatenation (VCAT) receiver, the expected sequence numbers being associated with a VCAT group that is in communication with the VCAT receiver, the method comprising:
obtaining a set of current sequence numbers associated with the VCAT group by the VCAT receiver;
determining by the VCAT receiver whether the set of current sequence numbers associated with the VCAT group does not include a first invalid sequence number;
determining by the VCAT receiver whether a set of previous sequence numbers associated with the VCAT group includes at least one invalid sequence number if it is determined that the set of current sequence numbers does not include the first invalid sequence number; and
replacing the expected sequence numbers with the set of current sequence numbers by the VCAT receiver if it is determined that the set of previous sequence numbers includes the at least one invalid sequence number.

16. The method of claim 15 further including:
setting a first variable to a first value to indicate that the set of current sequence numbers includes substantially only valid sequence numbers if it is determined that the set of current sequence numbers does not include the invalid sequence numbers.

17. The method of claim 16 wherein the first variable is previously set to a second value to indicate that the set of previous sequence numbers includes the at least one invalid sequence number.

18. The method of claim 17 wherein determining whether the set of previous sequence numbers includes the at least one invalid sequence number includes determining whether the first variable was previously set to the second value.

19. The method of claim 15 wherein determining whether the set of current sequence numbers does not include the first invalid sequence number includes determining whether the set of current sequence numbers includes substantially only in bounds sequence numbers and non-duplicated sequence numbers.

20. The method of claim 19 wherein determining whether the set of current sequence numbers does not include the first invalid sequence number further includes determining whether the set of current sequence numbers does not include any sequence number that is not also included in the set of previous sequence numbers.

21. The method of claim 15 further including:
sorting the set of current sequence numbers.

22. An apparatus suitable for use in a transport network and being arranged as a sink associated with a virtual concatenation (VCAT) group, the apparatus comprising:
means for obtaining a set of current sequence numbers associated with the VCAT group;
means for determining whether the set of current sequence numbers associated with the VCAT group does not include a first invalid sequence number;
means for determining whether a set of previous sequence numbers associated with the VCAT group includes at least one invalid sequence number if it is determined that the set of current sequence numbers does not include the first invalid sequence number; and
means for replacing the expected sequence numbers with the set of current sequence numbers if it is determined that the set of previous sequence numbers includes the at least one invalid sequence number.

23. The apparatus of claim 22 further including:
means for setting a first variable to a first value to indicate that the set of current sequence numbers includes substantially only valid sequence numbers if it is determined that the set of current sequence numbers does not include the invalid sequence numbers.

24. The apparatus of claim 23 wherein the first variable is previously set to a second value to indicate that the set of previous sequence numbers includes the at least one invalid sequence number, wherein the means for determining whether the set of previous sequence numbers includes the at least one invalid sequence number include means for determining whether the first variable was previously set to the second value.

25. The apparatus of claim 22 wherein the means for determining whether the set of current sequence numbers does not include the first invalid sequence number include means for determining whether the set of current sequence numbers includes substantially only in bounds sequence numbers and non-duplicated sequence numbers.

26. The apparatus of claim 25 wherein the means for determining whether the set of current sequence numbers does not include the first invalid sequence number further includes means for determining whether the set of current sequence numbers does not include any sequence number that is not also included in the set of previous sequence numbers.

27. An apparatus suitable for use in a transport network and being arranged as a sink associated with a virtual concatenation (VCAT) group, the apparatus comprising:
a memory, the memory being arranged to store expected sequence numbers associated with the VCAT group; and
a processing device to obtain a set of current sequence numbers associated with the VCAT group, to determine whether the set of current sequence numbers does not include a first invalid sequence number, to determine whether a set of previous sequence numbers associated with the VCAT group includes at least one invalid sequence number if it is determined that the set of current sequence numbers does not include the first invalid sequence number, and to replace the expected sequence numbers with the set of current sequence numbers if it is determined that the set of previous sequence numbers includes the at least one invalid sequence number.

28. The apparatus of claim 27 wherein the processing device further sets a first variable to a first value to indicate that the set of current sequence numbers includes substantially only valid sequence numbers if it is determined that the set of current sequence numbers does not include the invalid sequence numbers.

29. The apparatus of claim 28 wherein the first variable is previously set to a second value to indicate that the set of previous sequence numbers includes the at least one invalid sequence number, and wherein the processing device further determines whether the first variable was previously set to the second value.

30. One or more memory devices encoded with computer executable instructions, that when executed, are operable to:
cause a set of current sequence numbers associated with a virtual concatenation (VCAT) group to be obtained, the VCAT group being associated with a VCAT sink;
cause a determination of whether the set of current sequence numbers does not include a first invalid sequence number;
cause a determination of whether a set of previous sequence numbers associated with the VCAT group includes at least one invalid sequence number if it is determined that the set of current sequence numbers does not include the first invalid sequence number; and
cause an expected set of sequence numbers associated with the VCAT group to be replaced with the set of current sequence numbers if it is determined that the set of previous sequence numbers includes the at least one invalid sequence number.

* * * * *